Patented Sept. 5, 1922.

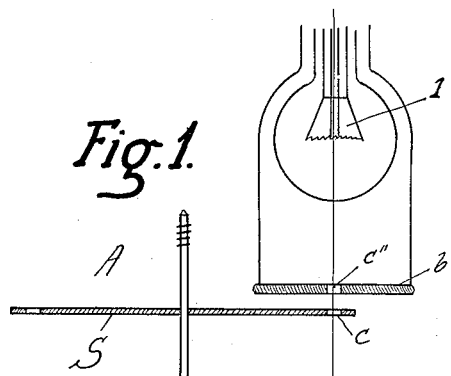
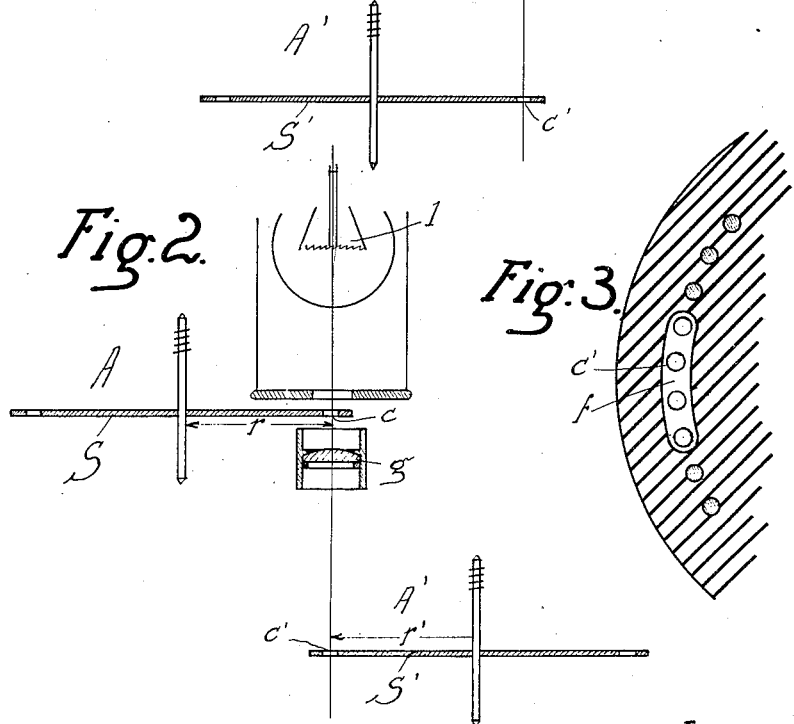
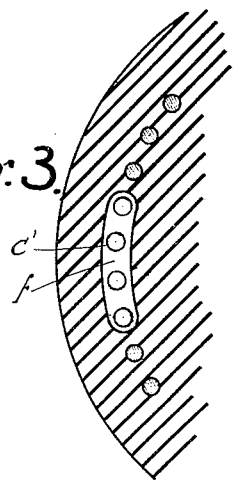

1,427,776

UNITED STATES PATENT OFFICE.

OTTO TITUSZ BLÁTHY, OF BUDAPEST, HUNGARY.

ADJUSTING ELECTRIC METERS.

Application filed January 14, 1922. Serial No. 529,268.

*To all whom it may concern:*

Be it known that I, OTTO TITUSZ BLÁTHY, engineer, a citizen of Hungary, residing at Budapest, in Hungary, have invented certain new and useful Improvements in Adjusting Electric Meters (for which I have filed application in Hungary Dec. 29, 1920; in Germany Jan. 7, 1921; in Austria June 6, 1921; in Italy June 25, 1921; and in Czecho-Slovakia July 27, 1921), of which the following is a specification.

In my patent numbered 1,199,150 is disclosed a method for adjusting rotating electricity meters in accordance with a standard meter, in which marks provided at uniform intervals at the circumference of the disc of one of the meters to be tested are observed through openings evenly distributed on the rotating part of the other meter. When the two meters run synchronously the marks appearing in the field of vision seem to be stationary. In the devices described in the aforesaid patent for carrying out the method, the eye of the person adjusting the meters has to be at a fixed point, and the field of vision has to be limited so that the said person when observing the field of image cannot see the parts to be adjusted of the meter.

The present invention eliminates the said drawbacks in such a manner that both the eyes as well as both the hands of the person effecting the adjusting are perfectly free, owing to which the adjusting can be done much more conveniently, quickly and in a more reliable manner.

The new device differs from the devices indicated in the Patent No. 1,199,150 by the fact that the rotating shutter provided on the standard meter is arranged in the path of a pencil of rays illuminating the marks on the rim of the rotating disc of the meter to be adjusted.

More particularly advantageous is the arrangement according to which a condenser lens is placed in the pencil of rays passing through the rotating shutter, between the latter and the disc of the meter to be adjusted.

Two constructions of the new device are diagrammatically illustrated by way of example in the accompanying drawing.

Fig. 1 is a form of the invention in which the shafts of the two disks are co-axial;

Fig. 2 is a form in which the shafts are parallel to one another but out of alignment, and Fig. 3 is an enlarged view of the field of view.

In the figures, A is the standard meter, and A' the meter to be adjusted by comparing it with the former. The marks on the rim of the disc S' of the meter to be adjusted are preferably perforations as shown in Figs. 2 and 3 of the Patent No. 1,199,150. The disc S of the standard meter is also provided with a ring of holes. At one point of the said ring of holes and above the same is arranged a source of light —*l*—, for instance an electric incandescent lamp which throws a pencil of rays through the perforations —*c*— of the disc S of the standard meter. The meter A' to be compared is so arranged relatively to the standard meter A that the beam of light strikes the disc of the meter to be set, at a point on the ring of perforations *c'*. When observing the disc S' of the meter to be set, a patch of light —*f*— of the shape of an arc of a circle will be noticed on the said disc (Figure 3), the opening *c'* standing out from the same as dark spots. According to Figure 1 the two meter discs S and S' are coaxial and above the perforated rim —*c*— of the standard meter A is arranged a stationary shutter —*b*— provided with a few perforations *c''* which are for instance of the same size and at the same distances apart as the perforations —*c*— of the standard meter disc S. If the two meters do not synchronize the points *c'* will move about in the fixed light patch —*f*— in one or the other direction, according as the meter to be adjusted is in advance of, or lagging behind the standard meter. It will be therefore necessary to continue to modify the setting until the points *c'* are brought to a standstill in the said light space.

In the form shown in Figure 2, the shutter —*b*— may be omitted if desired but in the path of the rays behind the disc S of the standard meter A is arranged a condenser lens —*g*—, owing to which an exceedingly bright and clearly defined spot of light is produced on the disc S' of the meter to be adjusted so that the adjusting can also be easily carried out in a light room.

While the appearance of the light streak due to the perforations in the disc of the standard meter, is a small arc of a circle about the axis of that disc, the light streak due to the perforations in the other disc would be curved around the other non-co-axial shaft, were it not for the effect of the optical system $g$. This condensing system causes the field of view of the form shown in Fig. 2 to also be like that illustrated in Fig. 3 that is with both light streaks curved about the same axis.

In the construction shown in Figure 2, the axes of the two meter discs S and S' are shifted parallel to each other a distance equal to the sum of the two radii $r, r'$ of the two circles of perforations $c$ and $c'$, in order that the projection of the perforations —c— reversed by the lens —g— should be curved in the same direction as the series of holes $c'$.

It will be seen therefore that in the new arrangement the patch of light —f— on the disc S' of the meter to be set can be observed from any desired point of the room without limiting the field of vision, that is to say with perfectly free eyes, and at the same time the adjusting parts of the meter can also be seen so that the adjusting can be carried out in a convenient and reliable manner within the shortest possible period of time.

Having now fully described and ascertained my said invention and the manner in which it is to be performed, I declare, that what I claim is:

1. A testing set for electric meters, comprising a pair of rotary parts mounted on parallel axes, one of which parts is provided with a circumferential series of equi-distant transparent spots, a source of light projecting a pencil of rays illuminating a portion of the marks, the other rotary part being provided with a circumferential series of equidistant marks, and a condensing and reversing optical system between the two rotary parts in the path of the pencil of light.

2. A testing set for electric meters comprising a pair of rotary disks, one of said disks being provided with a series of equi-distant marks around the rim, a source of light projecting a pencil of rays illuminating a portion of said marks, said second rotary disk having a series of equi-distant transparent spots around the rim arranged in the path of the pencil of light rays, and a condensing and reversing optical system located in the path of the pencil of light rays between the two disks, whereby the speed of rotation of the disks may be compared independent of any sighting device.

In testimony whereof I affix my signature in presence of two witnesses.

Dr. OTTO TITUSZ BLÁTHY.

Witnesses:
 Charles Medgyes,
 Eugene Harrany.